Nov. 11, 1969     E. V. McMULLIN ET AL     3,477,833
PROCESS FOR THE PRODUCTION OF A NATURAL GAS SUBSTITUTE
Filed Jan. 6, 1965
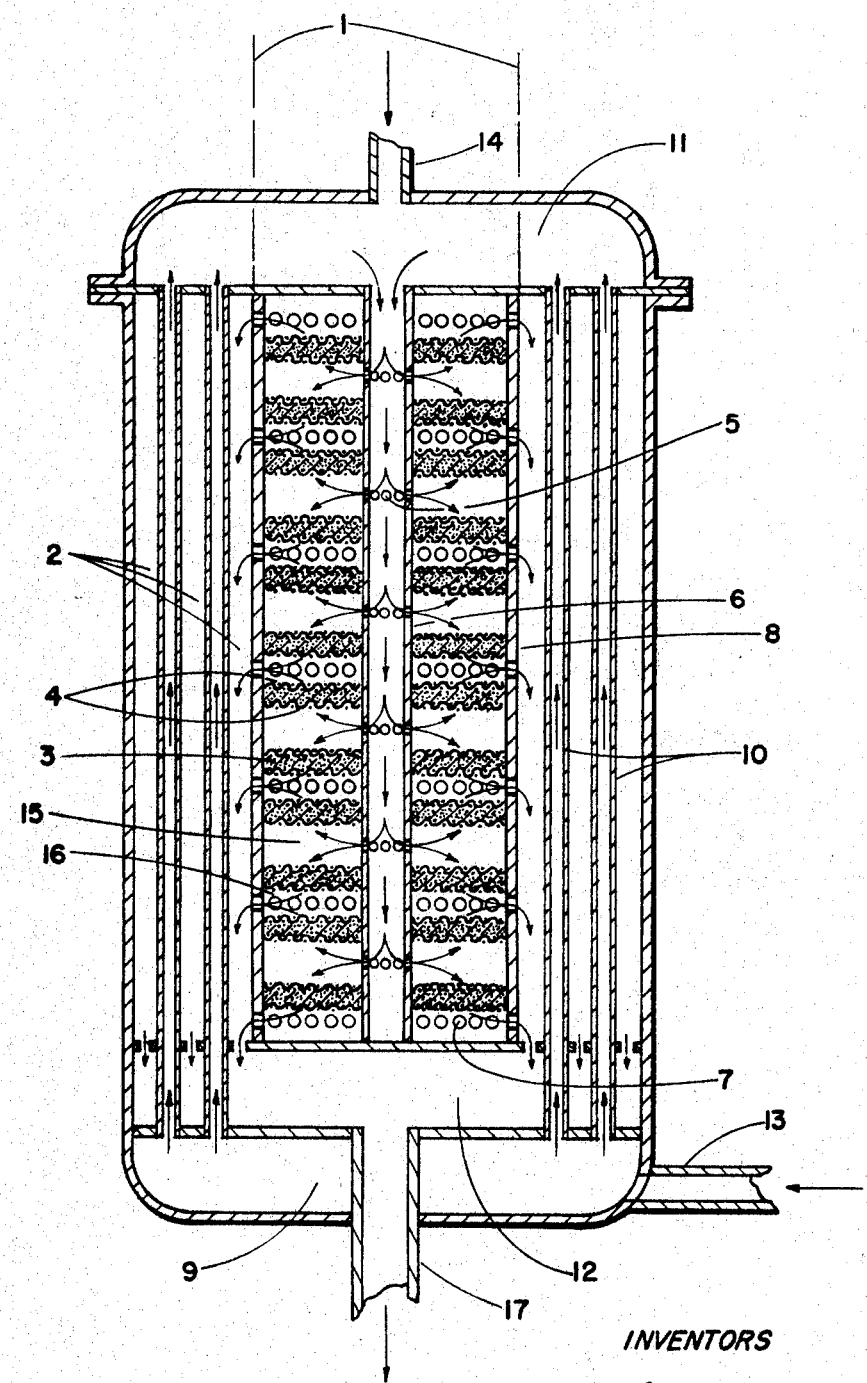
INVENTORS
Edward V McMullin
John G. Hofer

3,477,833
PROCESS FOR THE PRODUCTION OF A NATURAL GAS SUBSTITUTE

Edward Vincent McMullin, St. Louis County, and John Gerald Hofer, Florissant, Mo., assignors to Laclede Gas Company, St. Louis, Mo., a corporation of Missouri
Filed Jan. 6, 1965, Ser. No. 423,768
Int. Cl. C01b 2/16
U.S. Cl. 48—214                2 Claims

ABSTRACT OF THE DISCLOSURE

A process for producing natural gas substitute from higher hydrocarbons, particularly propane and water, using thin bed (about 2") pyrophoric nickel catalyst on sand as a "peak shaving device" at a high flow of at least 5000 standard cubic feet per hour of product gas per cubic foot of catalyst bed. The temperature is 300–450° C., the nickel is of a particle size of $10^{-5}$–$10^{-6}$ centimeters and the sand has a particle size passing 30 mesh.

---

This invention relates to a process for the production of a natural gas substitute by catalytic reforming of hydrocarbons.

Natural gas substitutes are constantly in demand by the Natural Gas Industry in order to provide a supplemental supply necessary to meet seasonal load requirements economically. This type of operation is generally accomplished with propane, propane-air, butane-air, or enriched manufactured gases dependent upon individual company environment. Although these are the most common supplemental gases used, there are decided disadvantages to the individual companies and their customers primarly because these gases are insufficient in interchangeability characteristics. This problem is of prime importance to the gas industry whenever future load requirements are reviewed and indicate the need for more supplemental gas supplies. That this is true is evidenced by increased activity in the liquefied storage of natural gas and other related fields by this industry.

One of the fields which can lend itself very readily to supplemental gas requirements is the field of catalytic reforming of higher hydrocarbons, such as propane, butane, and fuel oils, into methane-rich natural gas substitutes. This type of gas production would take care of the previously discussed problems of interchangeability by giving the industry a gas which is very close in chemical content to the natural gas primarily used in their present systems. But in order for this type of gas production to be accepted as a practical solution to the supplemental gas supply problem it must be at least as attractive in deliverability and economics as the present methods employed. This is where the present state of the art in the catalytic reforming of higher hydrocarbons is inadequate. The present known methods of catalytic reforming of higher hydrocarbons centers primarily around nickel based catalysts. And because most catalytic cracking processes are not intended to produce gas capacities of the magnitude of MM s.c.f./hr., they therefore require large amounts of catalysts and associated large containment vessels and equipment per volume of gas produced. This requires additional initial plant investments as compared to plant investments associated with said present methods of producing supplemental gas supplies.

It is therefore the object of this invention to provide an improved process for the production of a natural gas substitute by catalytic reforming of higher hydrocarbons in such a manner as to allow the handling of large flow volumes within as small a vessel as is practical.

Various other objects and advantages of the invention will be obvious from the following detailed description thereof.

This invention relies on the reforming of hydrocarbons into methane at relatively low temperatures and pressures in the presence of a pyrophoric nickel catalyst. To this end, our invention consists in preparing and arranging the said nickel catalyst in such a manner as to obtain maximum product gas with a minimum amount of catalyst occupying a minimum volume.

In the process of the catalytic steam reforming of hydrocarbons into a methane-rich gas, temperatures ranging from 350° to 450° C. are desired to obtain the most practical hydrocarbon conversion. The vaporous hydrocarbon feedstock is admixed with steam in such a ratio as to obtain complete reforming of the hydrocarbon to methane, carbon monoxide, carbon dioxide, and possibly hydrogen. This ratio is determined both experimentally and stoichiometrically from the length of the carbon chain of the feedstock in such a manner as to provide enough heat through the exothermic reaction to allow the entire process to be thermally neutral if possible since heat recovery will be necessary in order to provide as economical a product gas as possible. It has been found that a slight excess of steam will insure that the reaction goes to completion without carbon deposition.

The steam (water)-hydrocarbon feedstock is heated to reaction temperatures by known heat exchanging principles, utilizing the outlet product gas as the heat source.

The preheated feedstock is then subdivided into parallel streams and allowed to pass simultaneously across multiple shallow beds of nickel catalyst. These multiple shallow beds of catalyst consist of a pyrophoric form of nickel prepared by coating or impregnating a suitable inert support with a pure nickel salt. The pure nickel salt preferred by these inventors is nickel nitrate. In this form a predetermined amount of nickel nitrate can easily be melted at relatively low temperatures and mixed with the inert material within a suitable vessel while still in the molten state and then allowed to solidify. The supported nickel is then reduced in air to the oxide of nickel before being dispersed into multiple shallow beds within the reaction vessel. The catalyst is then reduced to nickel in place by passage of hydrogen through the beds while being maintained at a temperature in the range of 230° to 250° C. Flow of hydrogen is continued until reduction is complete and water ceases to be evolved. It is to be noted that although the above described reduction will take place at higher temperatures, it is desirable to complete the reaction at the temperature indicated in order to prevent the previously mentioned finely divided nickel oxide particles from sintering while being reduced. Suggested hydrogen flows are about 1 ft.³/hr./100 gms. of nickel oxide at slightly above atmospheric pressure. X-ray defraction analysis has determined that the metallic nickel produced in this manner is a pyrophoric form having a particle size in the range of $10^{-5}$ to $10^{-6}$ cm. This very finely divided nickel dispersed on an inert such as fine sand having a maximum particle size of say about .06 cm. provides a very large nickel surface area in a minimum of volume. The larger the particle size of the nickel used as a cracking catalyst, the less active is its effect on the reaction and the output product gas is reduced accordingly. It has been determined that nickel oxide reduced in said manner to produce the finely divided pyrophoric nickel of particle size ranging from $10^{-5}$ to $10^{-6}$ cm. and smaller is the best form of nickel to produce the methane-rich gases described herein.

The shallow bed arrangement of this pyrophoric nickel catalyst referred to earlier is characterized by layers of catalyst having as near a constant depth as possible. This constant depth is determined experimentally and is largely dependent upon the exact hydrocarbon to be employed in the process. Experiments have shown that the initial portion of the catalyst bed provides the greatest amount of cracking because in subsequent portions of the bed, catalyst contact with the feedstock decreases as the presence of the product gas increases; i.e., the feedstock to product gas ratio is greatest at the inlet to the bed and rapidly decreases as the bed is extended until such time as it theoretically becomes zero rendering any remaining bed useless as a catalyst available to feedstock. Therefore, in order to maintain small catalyst beds, it becomes necessary to limit the bed lengths to some small amount larger than that length at which the feedstock to product gas ratio becomes zero (to allow for adjustments in bed length due to possible temporary carbon deposition in the initial cracking area of the bed) and satisfy the desire for large flows by increasing the amount of cross-sectional bed area available to the feedstock. This not only provides the additional amounts of catalyst needed to produce the cracking desired but also feedstock velocities are reduced drastically and provide longer feedstock contact time in the short bed which tends to increase the efficiency of said bed.

Beds of relatively short lengths also reduce the amount of catalyst available to the product gases and subsequently prevent the cracking of product gases into CO, $CO_2$, and $H_2$. Since these constituents are of a low energy level, they are not particularly desirable in any larger quantities than necessary in the end product gases.

The product gases leaving said multiple shallow pyrophoric nickel catalyst beds will have an energy level slightly lower than natural gas dependent largely upon the CO, $CO_2$, and $H_2$ content. If the $CO_2$ is removed through a known separation technique, the end product gas will be nearer to the energy level of natural gas. But in either case, the addition of a small quantity of hydrocarbon feedstock to the product gases will satisfactorily raise the energy level to the exact level desired and thereby produce a perfect natural gas substitute. The exact configuration of the multiple shallow beds will depend largely on the containment vessel being employed in the process. In designing the configuration of the containment vessel, consideration should be given to the multiple beds themselves. Since these beds will be a constant depth, the process will depend on the ratio of cross-sectional area of these beds to produce the total flow desired; i.e., the larger the cross-sectional area of each bed, the fewer beds required to produce a given total flow. A suggested containment vessel configuration and how it would be employed in the process is presented in the attached figure and the subsequent detailed explanation.

The attached figure is an axial cross section of a typical containment vessel to be used in conjunction with the aforementioned process.

In said figure a central catalytic chamber 1 encompassed by a heat exchanging unit 2 is comprised of multiple parallel layers of catalytic beds 3 individually contained between two layers of wire gauze 4 and evenly supported between, but not covering, inlet perforations 5 in center distribution pipe 6 and outlet perforations 7 in central catalytic chamber's outer shell 8. Said heat exchanging unit 2 is a single pass exchanger comprised of an inlet hydrocarbon distribution chamber 9, a heat exchanger tube section 10, an admix collection chamber 11, and an exit gas chamber 12. Initially the entire vessel is brought up to say about 600° C. externally after which a continuous supply of hydrocarbon feedstock enters said inlet hydrocarbon distribution chamber 9 through pipe 13. Said hydrocarbon feedstock immediately begins conducting heat from the exit product gases present in said exit gas chamber 12 while the process of distributing said hydrocarbon feedstock into said heat exchanger tube section 10 is in progress. Said hydrocarbon feedstock flows continuously through said heat exchanger tube section 10 receiving heat from said exit product gases until said hydrocarbon feedstock emerges into said admix collection chamber 11. Within this chamber hydrocarbon feedstock temperatures are sensed, and steam in such a quantity and energy level as to provide the previously mentioned water to hydrocarbon ratio necessary to maintain end product chemical balance, prevent carbon deposition in said catalytic beds 3, and maintain the resulting hydrocarbon-water feedstock at say about 350°–450° C. prior to entering said catalytic beds 3 is introduced into said admix collection chamber 11 through pipe 14. The hydrocarbon-water feedstock then passes through said center distribution pipe 6 where said feedstock is able to simultaneously enter each individual set of said inlet perforations 5 associated with two diametrically opposed said catalytic beds 3 separated by the pre-catalytic distribution chamber 15 where said hydrocarbon-water feedstock is able to decrease its velocity and enter said catalytic beds 3 in such a manner as to obtain maximum contact between said feedstock and said beds. After completing contact with said catalytic beds 3 said feedstock will adequately be converted into desired product gases which are then collected in the post-catalytic collection chamber 16 to prevent any possibilty of said product exit gases from inducing any channeling while leaving said catalytic beds 3. Said exit product gases are then able to pass evenly and simultaneously through each set of said outlet perforations 7 in said central catalytic chamber's outer shell 8 associated with said post-catalytic collection chambers 16 into said heat exchanger tube section 10 where said exit product gases can proceed to said exit gas chamber 12 while continuously releasing the heat associated with the 350°–450° C. reaction temperature maintained in said catalytic beds 3. In said exit gas chamber 12 all the product gases gather and proceed to leave said exit gas chamber 12 through the exit pipe 17 for use as a supplemental gas supply.

What is claimed is:

1. A continuous porcess of catalytically reforming of higher hydrocarbons and water feedstock into methane-rich gases, which comprises the heating of said feedstock to a temperature of 300°–450° C. for reacting in the presence of a catalyst bed utilizing a pyrophoric form of nickel having a particle size of $10^{-5}$ to $10^{-6}$ cm. supported on sand of such a particle size so as to pass through a 30 mesh screen providing maximum cracking activity per unit weight of said nickel and per unit volume of said catalyst bed and arranged in such a manner as to provide a variable volume catalyst bed having a depth not to exceed 2 inches and a variable cross section of said catalyst bed dictated by the containing vessel configuration and enough of said catalyst beds in parallel flow arrangements within said containing vessel to produce a total flow of at least about 5000 standard cubic fet per hour of product gas per cubic foot of said catalyst bed.

2. A process according to claim 1 in which said catalyst contains between about 1 and about 20 weight percent nickel.

References Cited

UNITED STATES PATENTS 2,949,429    8/1960    Bailey et al. _ _ _ _ 252—466 XR

FOREIGN PATENTS 645,139    3/1964    Belgium.
981,726    1/1965    Great Britain.

MORRIS O. WOLK, Primary Examiner

R. E. SERWIN, Assistant Examiner

U.S. Cl. X.R.

23—288